United States Patent
Jácome Muñoz et al.

(10) Patent No.: US 12,146,949 B2
(45) Date of Patent: Nov. 19, 2024

(54) PHASE MODULATED CONTINUOUS WAVE RADAR SYSTEM THAT USES VELOCITY LABELED MULTIPLEXING FOR GENERATING DETECTIONS

(71) Applicant: GM Cruise Holdings LLC, San Francisco, CA (US)

(72) Inventors: Jorge Julio Jácome Muñoz, Munich (DE); Andre Giere, Oberpframmern (DE); Özlem Karaca, Munich (DE); Johanna Gütlein-Holzer, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 395 days.

(21) Appl. No.: 17/535,562

(22) Filed: Nov. 24, 2021

(65) Prior Publication Data

US 2023/0047968 A1    Feb. 16, 2023

Related U.S. Application Data

(63) Continuation-in-part of application No. 17/407,110, filed on Aug. 19, 2021, now Pat. No. 12,019,151.
(Continued)

(30) Foreign Application Priority Data

Aug. 3, 2021 (EP) .................................. 21189485
Nov. 19, 2021 (EP) .................................. 21209387

(51) Int. Cl.
*G01S 13/931* (2020.01)
*G01S 7/02* (2006.01)
(Continued)

(52) U.S. Cl.
CPC ............ *G01S 13/931* (2013.01); *G01S 7/354* (2013.01); *G01S 13/343* (2013.01);
(Continued)

(58) Field of Classification Search
CPC ...... G01S 13/931; G01S 13/325; G01S 13/34; G01S 13/32; G01S 13/42; G01S 13/584;
(Continued)

(56) References Cited

U.S. PATENT DOCUMENTS 5,291,202 A * 3/1994 McClintock .............. G01S 7/36
342/16
5,422,646 A * 6/1995 Lewis ................... G01S 13/528
342/194

(Continued)

FOREIGN PATENT DOCUMENTS

| CN | 115902858 A | 4/2023 |
| EP | 3315994 A1 | 5/2018 |
| EP | 3611538 A1 | 2/2020 |

OTHER PUBLICATIONS

"Office Action for U.S. Appl. No. 17/394,383", Mailed Date: Sep. 6, 2023, 11 pages.
(Continued)

*Primary Examiner* — Vladimir Magloire
*Assistant Examiner* — Michael W Justice
(74) *Attorney, Agent, or Firm* — Calfee, Halter & Griswold LLP

(57) ABSTRACT

A phase modulated continuous wave (PMCW) multiple input multiple output (MIMO) radar system is described herein. The radar system is configured to compute range, velocity, and direction of arrival angle of objects relative to the radar system. The radar system includes several transmitting antennas and several receiving antennas, where selected transmitting antennas simultaneously transmit radar signals based on the same modulation signal. Per transmitting antenna, the transmissions are modulated with respective phase offsets on a per pulse repetition interval (PRI) basis. Hence, a coupling between phase shifts over PRI and transmitter positions is established. Effectively, then, each
(Continued)

transmitting antenna is labeled with a velocity offset that corresponds to the phase rate of change assigned to the transmitting antenna. This approach is referred to herein as velocity-labeled multiplexing (VLM).

20 Claims, 9 Drawing Sheets

Related U.S. Application Data which is a continuation of application No. 17/394,383, filed on Aug. 4, 2021.

(51) Int. Cl.
  *G01S 7/35* (2006.01)
  *G01S 13/34* (2006.01)
  *G01S 13/58* (2006.01)
(52) U.S. Cl.
  CPC ........... *G01S 13/584* (2013.01); *G01S 7/0233* (2021.05); *G01S 7/356* (2021.05)
(58) Field of Classification Search
  CPC ........ G01S 7/356; G01S 7/023; G01S 7/0234; G01S 7/0233; G01S 7/354
  USPC .......................................... 342/70, 200, 104
  See application file for complete search history.

(56) References Cited

U.S. PATENT DOCUMENTS

| | | | |
|---|---|---|---|
| 7,031,265 B2 | 4/2006 | Owen et al. | |
| 9,541,638 B2 | 1/2017 | Jansen et al. | |
| 9,720,073 B1* | 8/2017 | Davis ................... | G01S 13/325 |
| 10,141,657 B2* | 11/2018 | Kishigami ............ | G01S 7/0234 |
| 10,386,462 B1 | 8/2019 | Hong et al. | |
| 10,585,182 B2* | 3/2020 | Bilik ..................... | G01S 13/931 |
| 10,620,305 B2 | 4/2020 | Cornic et al. | |
| 10,630,249 B2* | 4/2020 | Rao ...................... | H03B 5/1228 |
| 10,921,436 B2 | 2/2021 | Jansen | |
| 11,073,607 B2 | 7/2021 | Koubiadis et al. | |
| 11,299,147 B2 | 4/2022 | Kang | |
| 11,402,483 B2 | 8/2022 | Long et al. | |
| 11,428,802 B2 | 8/2022 | Barngrover et al. | |
| 11,428,805 B2* | 8/2022 | Kishigami ............ | G01S 13/534 |
| 11,614,531 B2 | 3/2023 | Wu et al. | |
| 11,614,538 B2 | 3/2023 | Davis et al. | |
| 11,662,427 B2 | 5/2023 | Wu et al. | |
| 11,762,088 B2* | 9/2023 | Kishigami ............ | G01S 13/003 342/104 |
| 2005/0063386 A1 | 3/2005 | Owen et al. | |
| 2016/0285172 A1* | 9/2016 | Kishigami .......... | G01S 13/4463 |
| 2018/0120427 A1 | 5/2018 | Cornic et al. | |
| 2018/0252809 A1 | 9/2018 | Davis et al. | |
| 2018/0275264 A1* | 9/2018 | Bilik ...................... | G01S 13/581 |
| 2019/0044485 A1* | 2/2019 | Rao ....................... | G01S 13/931 |
| 2020/0049812 A1 | 2/2020 | Jansen | |
| 2020/0166625 A1 | 5/2020 | Koubiadia et al. | |
| 2020/0217945 A1 | 7/2020 | Long et al. | |
| 2020/0238982 A1 | 7/2020 | Kang | |
| 2020/0393553 A1* | 12/2020 | Kishigami ............ | G01S 13/343 |
| 2021/0173042 A1 | 6/2021 | Wu et al. | |
| 2021/0173069 A1 | 6/2021 | Wu et al. | |
| 2021/0190904 A1* | 6/2021 | Bourdoux ............... | G01S 13/89 |
| 2021/0333386 A1* | 10/2021 | Park ........................ | G01S 7/356 |
| 2022/0171048 A1 | 6/2022 | Kishigami | |
| 2022/0171049 A1* | 6/2022 | Wu ......................... | G01S 13/34 |
| 2022/0209396 A1 | 6/2022 | Lee et al. | |
| 2022/0283286 A1 | 9/2022 | Wu et al. | |
| 2022/0350020 A1 | 11/2022 | Davis et al. | |
| 2022/0381903 A1* | 12/2022 | Kishigami ............ | G01S 13/343 |
| 2023/0043829 A1 | 2/2023 | Giere et al. | |
| 2023/0048316 A1 | 2/2023 | Giere et al. | |
| 2023/0243964 A1 | 8/2023 | Davis et al. | |
| 2023/0393268 A1* | 12/2023 | Kishigami .............. | G01S 13/42 |

OTHER PUBLICATIONS

"Response to the Communication Pursuant to Rule 69 EPC for European Patent Application No. 21209387.6", Filed Date: Nov. 24, 2023, 15 pages.
"Office Action for U.S. Appl. No. 17/407,110", Mailed Date: Aug. 25, 2023, 13 pages.
"Extended European Search Report for European Patent Application No. 21189485.2", Mailed Date: Jan. 27, 2022, 7 pages.
"Extended European Search Report for European Patent Application No. 21209387.6", Mailed Date: May 2, 2022, 11 pages.
Sun, et al., "Analysis and Comparison of MIMO Radar Waveforms", In 2014 International Radar Conference, Oct. 13, 2014, pp. 1-6.
"Response to the Office Action for U.S. Appl. No. 17/394,383", Filed Date: Jan. 19, 2024, 11 pages.
"Response to the Office Action for U.S. Appl. No. 17/407,110", Filed Date: Jan. 19, 2024, 9 pages.
"Notice of Allowance and Fees Due for U.S. Appl. No. 17/407,110", Mailed Date: Feb. 15, 2024, 5 pages.
"Notice of Allowance and Fees Due for U.S. Appl. No. 17/394,383", Mailed Date: Mar. 6, 2024, 5 pages.

* cited by examiner

PHASE MODULATED CONTINUOUS WAVE RADAR SYSTEM THAT USES VELOCITY LABELED MULTIPLEXING FOR GENERATING DETECTIONS

RELATED APPLICATIONS

This application claims priority to European Patent Application No. EP21209387.6, filed on Nov. 19, 2021, and entitled "PHASE MODULATED CONTINUOUS WAVE RADAR SYSTEM THAT USES VELOCITY LABELED MULTIPLEXING FOR GENERATING DETECTIONS". This application is also a continuation-in-part of U.S. patent application Ser. No. 17/407,110, filed on Aug. 19, 2021, and entitled "RADAR SYSTEM THAT USES VELOCITY LABELED MULTIPLEXING FOR GENERATING DETECTIONS", which is a continuation of U.S. patent application Ser. No. 17/394,383, filed on Aug. 4, 2021, and entitled "RADAR SYSTEM THAT USES VELOCITY LABELED MULTIPLEXING FOR GENERATING DETECTIONS", which claims priority to European Patent Application No. EP21189485.2, filed on Aug. 3, 2021, and entitled "RADAR SYSTEM THAT USES VELOCITY LABELED MULTIPLEXING FOR GENERATING DETECTIONS". The entireties of these applications are incorporated herein by reference.

BACKGROUND

An autonomous vehicle is a motorized vehicle that can operate without human conduction. An exemplary autonomous vehicle includes a plurality of sensor systems, such as but not limited to, a lidar sensor system, a camera sensor system, and a radar sensor system, amongst others. The autonomous vehicle operates based upon sensor signals output by the sensor systems. For example, a radar sensor system can identify a range from the autonomous vehicle to another vehicle in a driving environment, and the autonomous vehicle can plan and execute a maneuver to traverse the driving environment based upon the identified range to the other vehicle.

Multiple-input multiple-output (MIMO) radar sensor systems can be utilized in autonomous vehicles to improve spatial resolution, while maintaining low hardware cost and complexity. Conventional MIMO radar sensor systems implement various types of multiplexing schemes, where mutually orthogonal modulated signal sequences are transmitted on a transmit side and de-multiplexed on a receiver side. Moreover, subsequent signal processing (mainly in the digital domain) can be employed to extract virtual channels with respect to their transmitter correspondence. Examples of multiplexing schemes that are conventionally utilized to provide orthogonal transmit signals include Time Division Multiplexing (TDM), Frequency Division Multiplexing (FDM), and Code Division Multiplexing (CDM).

In TDM, orthogonality among the transmitted signals is obtained in the time domain by dividing a transmit period into time slots, where only a single transmitter from the multiple transmitters of the MIMO radar sensor system irradiates per time slot. However, a MIMO radar sensor system that implements TDM can expose motion-induced phase error in the virtual channels due the time elapsed between consecutively acting transmitters. Relative to other approaches, TDM schemes may also lead to increased measurement time and velocity ambiguity, with both increasing based on the number of participating transmitters.

In FDM, orthogonality among transmitted signals is obtained in the frequency domain by dedicating an exclusive and non-overlapping frequency band for each transmitter of the MIMO radar sensor system. However, greater receiver bandwidth is typically needed to support FDM relative to other types of multiplexing schemes. Moreover, hardware complexity can be increased for modulation, multiplexing, demodulation, and demultiplexing in a MIMO radar sensor system that employs FDM as compared to other types of multiplexing.

In CDM, orthogonality among the transmitted signals is obtained by modulation of a mutually orthogonal spread code for each transmitter in slow-time or fast-time sequences. To obtain the virtual channel elements corresponding to a transmitter, demultiplexing can occur by cross-correlation of the per channel sequence with the respective spread code. CDM can be computationally intensive, since spreading occurs prior to range (fast-time spread code) or velocity processing (slow-time spread code), respectively, resulting in more channels in subsequent processing steps. Moreover, the resulting velocity spectrum can be prone to high sidelobe levels (which may be addressed by increasing the sequence length in fast-time or slow-time, respectively).

SUMMARY

The following is a brief summary of subject matter that is described in greater detail herein. This summary is not intended to be limiting as to the scope of the claims.

A phase modulated continuous wave (PMCW) multiple input multiple output (MIMO) radar system is described herein. The radar system is configured to compute the range, velocity, and direction of arrival angle of objects relative to the radar system. The radar system includes several transmitting antennas and several receiving antennas, where the transmitting antennas simultaneously transmit radar signals based on the same modulation signal. Per transmitting antenna, the transmissions are modulated with respective phase offsets on a per pulse repetition interval (PRI) basis. Hence, a coupling between phase shifts over PRI and transmitter positions is established. Effectively, then, each transmitting antenna is labeled with a velocity offset that corresponds to the phase rate of change assigned to the transmitting antenna. This approach is referred to herein as velocity-labeled multiplexing (VLM).

Receiver channels of the radar system receive echo signals caused by the transmitted signals reflecting from objects, whereupon the echo signals are processed to provide frequency spectra. With respect to a received echo signal and a single receiver channel, energy of the echo signal is distributed and ordered into distinguishable positions in the velocity spectrum (e.g., velocity bins) in correspondence to the unique phase offset modulation of the ramps in the transmitted radar signal that corresponds to the echo signal. Furthermore, the energy distribution in the velocity spectrum is determined by the actual velocity of a detected object in terms of a velocity offset. This shifts the positions of the energy peaks in the velocity spectrum by a number of velocity bins relative to the actual velocity. However, the order of the positions and the distance among the positions is maintained irrespective of the object's actual velocity.

A virtual receiver array can be formed by collecting the receive channels corresponding to the transmitters as identified in the velocity spectrum. Beamforming applied on this virtual array provides the beam spectrum for the respective velocity bin.

Generally, however, prior knowledge about the actual velocity of the object is unavailable in a signal processing system. Consequently, a position in the velocity spectrum to begin with collecting respective receive channels for virtual array formation is unknown. Therefore, the subsequent processing steps can be described as follows: 1) virtual array formation is begun with receivers respective to a first velocity bin and consecutive velocity bins due to the known velocity offset labeling scheme; 2) virtual array formation is continued consecutively for all velocity bins in a circular manner throughout a velocity spectrum of the radar system; 3) beamforming is undertaken with each virtual array; 4) after beamforming, the velocity spectrum will peak with a mainlobe at the position of the actual velocity of the object and expose sidelobes at some other positions; and 5) this information can be detected and used to measure the actual velocity of the object.

Reduction in processing performed to compute velocities is possible by including the following processing steps, as will be described in greater detail herein: 1) incoherent integration is performed over receive channels to form a heat map; 2) target detection and target velocity identification is performed under consideration of the velocity labeling scheme and range dependent subarray formation; 3) beamforming with a complete virtual array at range-velocity bins identified in step 2); and 4) detection with enhanced signal to noise ratio is performed due to coherent integration of all virtual channels in the beamforming step. Again, this procedure reduces the amount of data that is processed.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
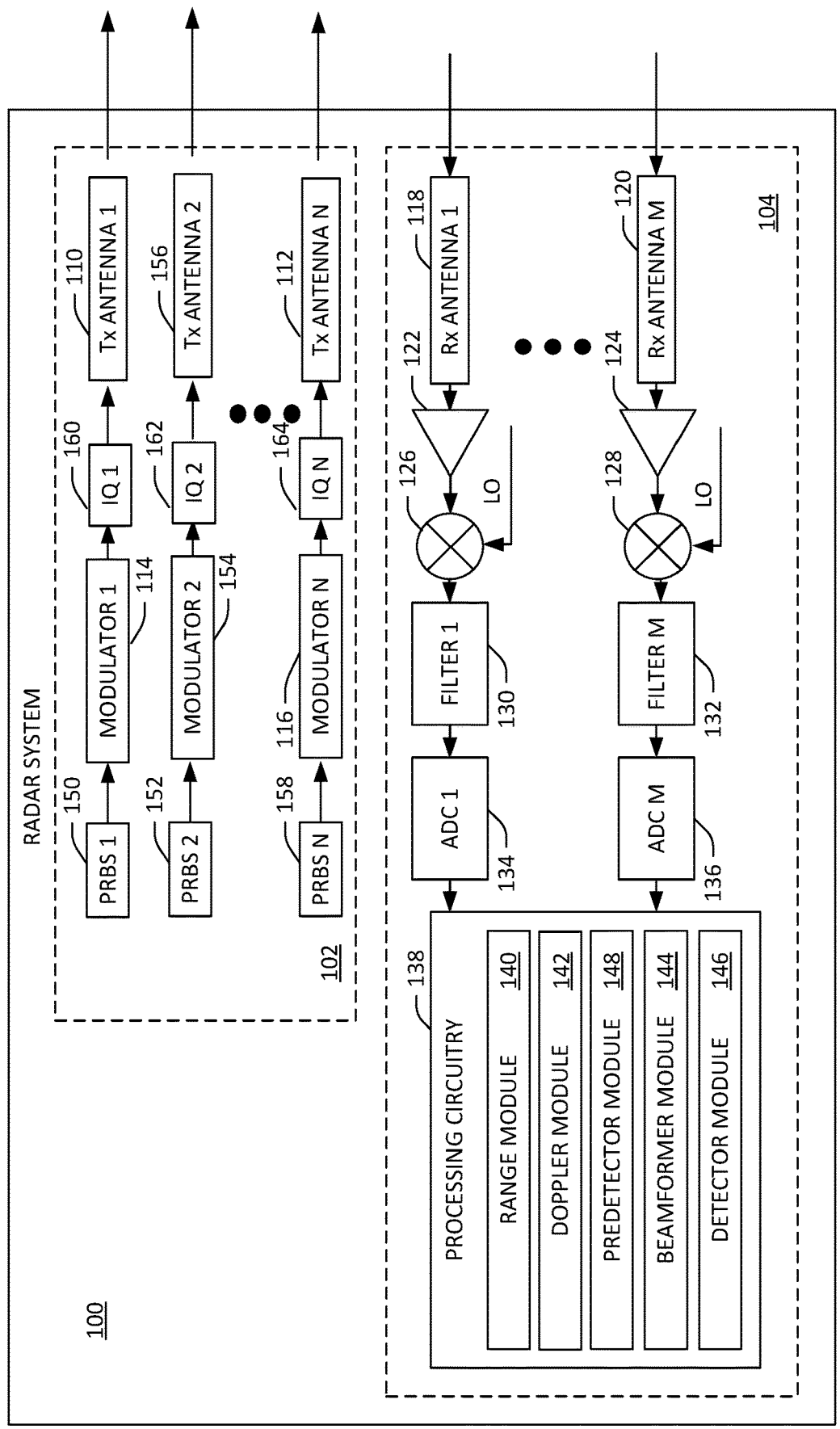
FIG. 1 is a functional block diagram of a phase modulated continuous wave (PMCW) multiple input multiple output (MIMO) radar system.

Various technologies pertaining to automotive radar sensor systems with two-dimensional beamforming using multiple receivers and multiple simultaneously operating transmitters are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

The technologies described herein generally relate to a radar system and a method of operating thereof, and more particularly to a radar system that efficiently uses of signal processing resources due to data reduction by way of a two-step process for generating a target detection, such that range to the target, relative velocity of the target, and relative direction of the target can be computed.

A phase modulated continuous wave (PMCW) radar system and method is described herein, where the radar system includes multiple receivers (M) and multiple simultaneously operating transmitters (N), thereby providing a two-dimensional virtual array with relatively high angular resolution in horizontal and vertical directions. To avoid extensive cycle time and velocity ambiguity, the transmitters are operated simultaneously and not sequentially (e.g., the transmitters transmit PMCW signals simultaneously). The transmitters are phase modulated and phase shifts are applied to the transmissions over a pulse repetition interval (PRI). To reduce computational resources, groups of transmitters can transmit based on the same modulation signal with respective phase shifts applied to each modulation signal. The modulation signals can be generated based on a seed input provided to a pseudo-random binary sequence generator (PRBS), which generates a code sequence that is modulated by a Gaussian Minimum Shift Keying (GMSK) modulator to generate the modulation signal. The same seed input can be provided to respective transmit chains and the PRBS generators on each transmit chain will generate the same code sequence.

Each transmission is modulated in phase over the PRI and at the receiver, a range profile for each transmit-receive pair is obtained by correlating the transmissions with a copy of the transmitted sequences. A Fast Fourier Transform (FFT) is applied to the sequence to determine the velocity profile for achieve a range-velocity echo profile for each receiver-channel. The phase increment can be selected in a way that the signals from individual transmitters are distributed over the velocity-dimension (Doppler division multiplex) with velocity offsets in accordance with the phase increments. In a PMCW radar system, if N=number of transmitters, and Q=number of unique seeds, then P=N/Q which is the number of phase shifts/velocity labels. Therefore, in a PMCW radar system, a single target exhibits P spectral repetitions in the velocity spectrum each of which is assigned to one of the multiple phase shifts applied uniformly to the transmitted sequences. Thus, the true velocity bin of the target is ambiguous, unless the assignment of the velocity bins to each transmitter is known. For the purpose of beamforming, the velocity bins assigned to each transmitter are extracted, resulting in M×N virtual receiving channels. A virtual array is then formed on which beamforming is processed. Finally, detection and filtering take place.

Since each group of transmitters transmit the same modulation signal on the PRI basis at respective phases, the number of matched filters at the receiver can be reduced, which enables a significant data reduction within the signal processing chain before beamforming, and thereby enables a reduction in an amount of processing resources required to perform velocity computation.

In an example, a pair of transmitters can transmit based on the same modulation signal, with each transmitter transmitting a uniquely phase shifted transmission. At the receiver, one seed input is used by the PRBS to generate a code for each transmission pair received, thus reducing by half the number of matched filters. In at least one embodiment, this reduction in resources required enables the receiver to double the number of range bins, or can halve the PRI by either halving the number of pings or ping length, or by providing an increased chip rate (×2).

With reference now to FIG. 1, a functional block diagram of a radar system 100 is presented. The radar system 100 includes transmitting electronics 102 and receiving electronics 104.

The transmitting electronics 102 include N transmitting antennas 110, 156, and 112 that output PMCW radar signals based upon the respective N PMCW radar signals output by the modulators 114, 154, and 116. In an example, the N transmitting antennas 110, 156, and 112 include between 2 and 12 transmitting antennas. In another example, the N transmitting antennas include between four and twenty transmitting antennas. It is to be understood, however, that there may be any suitable number of transmitting antennas 110, 156, and 112 in the transmitting electronics 102, where N is greater than 1. In an example, the transmitting antennas 110, 156, and 112 are included in a two-dimensional array of transmitting antennas, such that the first transmitting antenna 110 is vertically offset from a second transmitting antenna in the transmitting antennas 110, 156, and 112 and is horizontally offset from a third transmitting antenna in the transmitting antennas 110, 156, and 112. In another example, the transmitting antennas 110, 156, and 112 are included in a one-dimensional array of transmitting antennas, such that the first transmitting antenna 110 is horizontally offset from a second transmitting antenna in the transmitting antennas 110, 156, and 112 but is not vertically offset from any other antenna in the transmitting antennas 110, 156, and 112.

Further, the transmitting antennas 110, 156, and 112 may be uniformly spaced with respect to one another, such that distances between any two adjacent antennas in the horizontal or vertical direction in the transmitting antennas 110, 156, and 112 is equivalent. In another example, the transmitting antennas are non-uniformly spaced with respect to one another, such that a first distance between a first pair of transmitting antennas that are adjacent to one another is different from a second distance between a second pair of transmitting antennas that are adjacent to one another.

The transmitting electronics 102 also include N PRBS generators 150, 152, and 158 that generate pseudo-random code sequences based on a seed input and a clock signal, and N modulators 114, 154, and 116 that are respectively coupled to the N transmitting antennas 110, 156, and 112, although the first modulator 114, as will be described herein, is optional. The modulators 114, 154, and 116 perform phase modulation on the PMCW radar signals based on the code sequences generated by PRBS generators 150, 152, and 158 on a PRI basis. The transmitting electronics 102 also include N IQ mixers 160, 162, and 164 that can perform phase shifts on the modulated signals before being transmitted by transmit antennas 110, 156, and 112. In an embodiment, PRBS generators 150 and 152 can receive the same seed input and generate identical code sequences resulting in the same modulated signal from modulators 114 and 154. IQ 160 can apply a first phase shift to the modulated signal transmitted by transmit antenna 110, and IQ 162 can provide a second phase shift to the modulated signal transmitted by transmit antenna 156.

The radar system 100 is configured to estimate a velocity of a target relative to the radar system 100 over a velocity range; for example, between 200 km/hour and 200 km/hour, and therefore a range of 400 km/hour. Each phase rate of change corresponds to a velocity offset within the velocity range. Thus, for a phase rate of change of zero (e.g., the PMCW signal output by the modulators 114, 154, and 116 are not subjected to phase modulation), the velocity offset is zero. In contrast, for a non-zero phase rate of change, the velocity offset is non-zero. The phase rates of change can be selected such that the velocity offsets are uniformly distributed across the velocity range (e.g., differences between velocity offsets that are adjacent to one another are all the same). In another example, the phase rates of change can be selected such that the velocity offsets are non-uniformly distributed across the velocity range; non-uniformly distributing the velocity offsets across the velocity range has advantages that are described in greater detail below.

Reference is now made to the receiver electronics 104. The receiver electronics include M receiving antennas 118-120 that are configured to detect echo signals (reflections of the signals emitted by the transmitting antennas 110, 156, and 112 off of objects in a scene) and output electrical signals that represent the detected echo signals. The receiver electronics 104 also include M amplifiers 122-124 that are respectively coupled to the receiving antennas 118-120, where the amplifiers 122-124 amplify electrical signals output by the receiving antennas 118-120.

The receiver electronics 104 further include mixers 126-128 that are respectively configured to downmix the amplified electrical signals output by the amplifiers 122-124 with a local oscillator (LO), thereby forming downmixed signals.

The receiver electronics 104 also include low pass filters 130-132 that are respectively electrically coupled to the mixers 126-128 and are configured to filter higher frequencies from the downmixed signals output by the mixers 126-128 and output filtered signals, where the filtered signals include frequencies in the baseband spectrum of the radar system 100. While not shown, the receiver electronics 104 optionally include second amplifiers that are respectively coupled to the low pass filters 130-132, where such amplifiers are configured to amplify the filtered signals.

The receiver electronics 104 further include analog to digital converters (ADCs) 134-136 that convert the filtered signals output by the low pass filters 130-132 from analog signals to digital signals, thereby outputting M digital signals. The receiver electronics 104 additionally include processing circuitry 138 that processes digital signals output by the ADCs 134-136. In an example, the processing circuitry 138 is or includes a digital signal processor (DSP), although other types of processing circuitry are contemplated. The processing circuitry 138 includes a range module 140, a Doppler module 142, a beamformer module 144, and a detector module 146. In addition, the processing circuitry optionally includes a predetector module 148. Operation of the modules 140-148 with respect to the digital signals output by the ADCs 134-136 is described in detail below.

As disclosed herein, there are two different steps contemplated for processing echo signals that are based upon the modulated signals emitted by the transmitting antennas 110-112. The first step includes a sequence of acts for estimating range, velocity, and angle of an object relative to the radar system 100. The second step includes a sequence of acts that are configured to reduce an amount of data processed by the processing circuitry 138 by exploiting properties of the VLM approach.

The first step is set forth herein. As an example, the ADC 136 samples from receiving antenna 120 are correlated with a copy of the N transmitted signals. The output of the digital correlator is a range spectrum (e.g., a range gate from 0 to K−1) for N virtual receivers stemming from receiving antenna 120.

The Doppler module 142 performs a velocity/Doppler FFT over slow time samples (a sequence of PRI) per virtual receive channel, thereby obtaining characteristic peaks in the velocity spectrum that are offset from one another in correspondence with the phase change rates assigned to the transmitting antennas 110-112. The Doppler module 142 can arrange the data set of one coherent processing interval in a three-dimensional complex-valued matrix (data cube) represented as follows:

$$mat_{CPI}(Rx_m, RG_k, VG_l) \quad (2)$$

Figure 5:
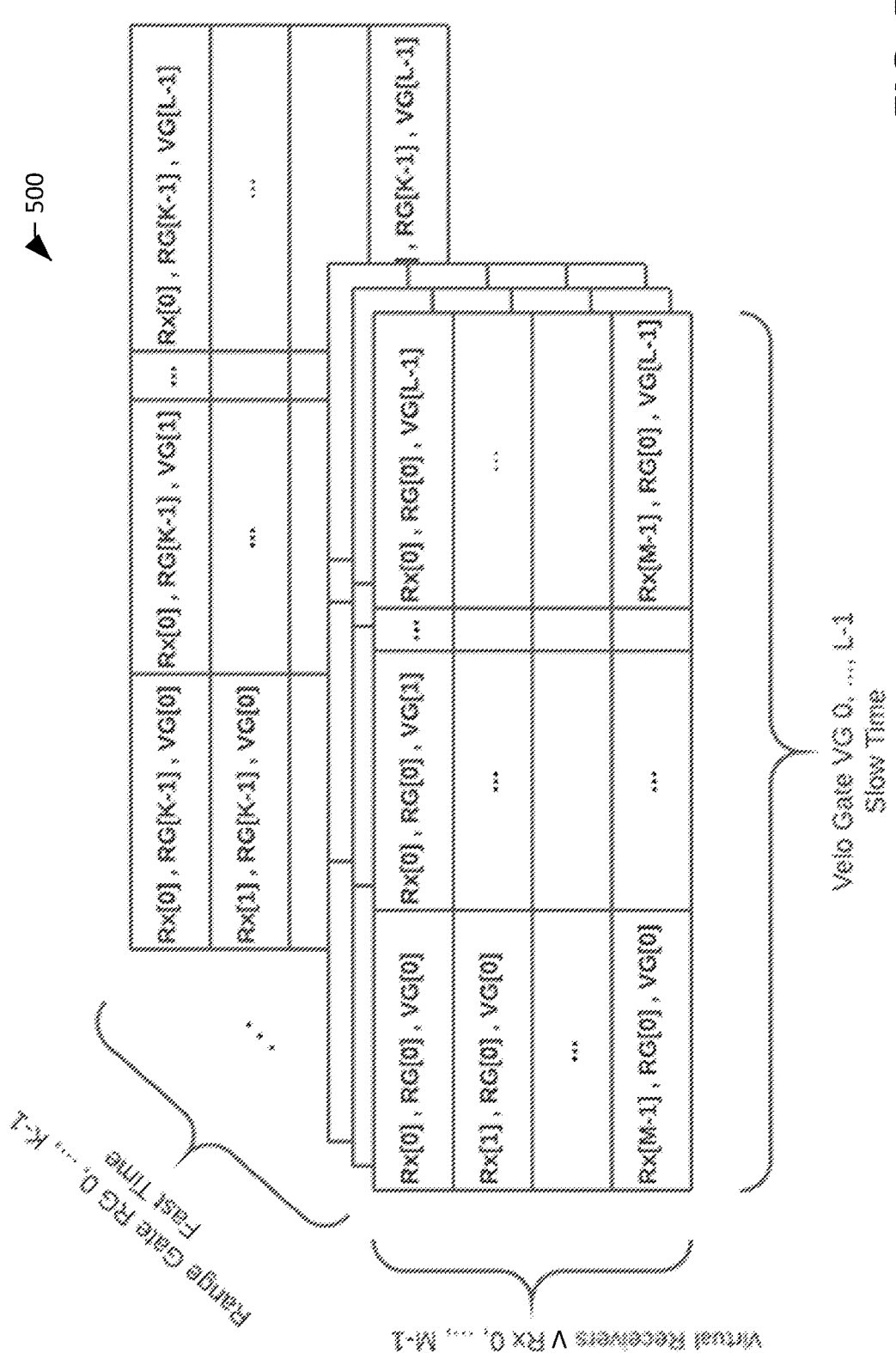
FIGS. 5 & 6 illustrate example multi-dimensional data matrices.

With dimensions range gates (RG), velocity gates (VG), and virtual receive channels (VRx), as illustrated by the data cube 500 depicted in FIG. 5.

For further transmitter demultiplexing, the Doppler module 142 can extract the virtual array of an individual transmitting antenna in each range-velocity gate from this data set, where the Doppler module 142 takes into account the velocity label $vlTx_n$ and transmitted sequence assigned to the particular transmitting antenna. The velocity labels are stored in the vector $velolabel(n)=(vlTx_0, vlTx_1, \ldots, vlTx_{P-1})^T$, sorted from p=0 to P−1, where p is assigned to individual transmitting antennas in the transmitting antennas 110-112. An extraction method that can be employed by the Doppler module 142 for a single range gate sample of the mth virtual receiver $Rx_m^{Tx_p}$ corresponding to the nth transmitter in the lth velocity gate is based on modulo operation in the velocity dimension:

$$Rx\frac{Tx_n}{m} = mat_{CPI}(Rx_m, RG_k, \mod(VG_l + vlTx_n, L)). \quad (3)$$

Figure 6:
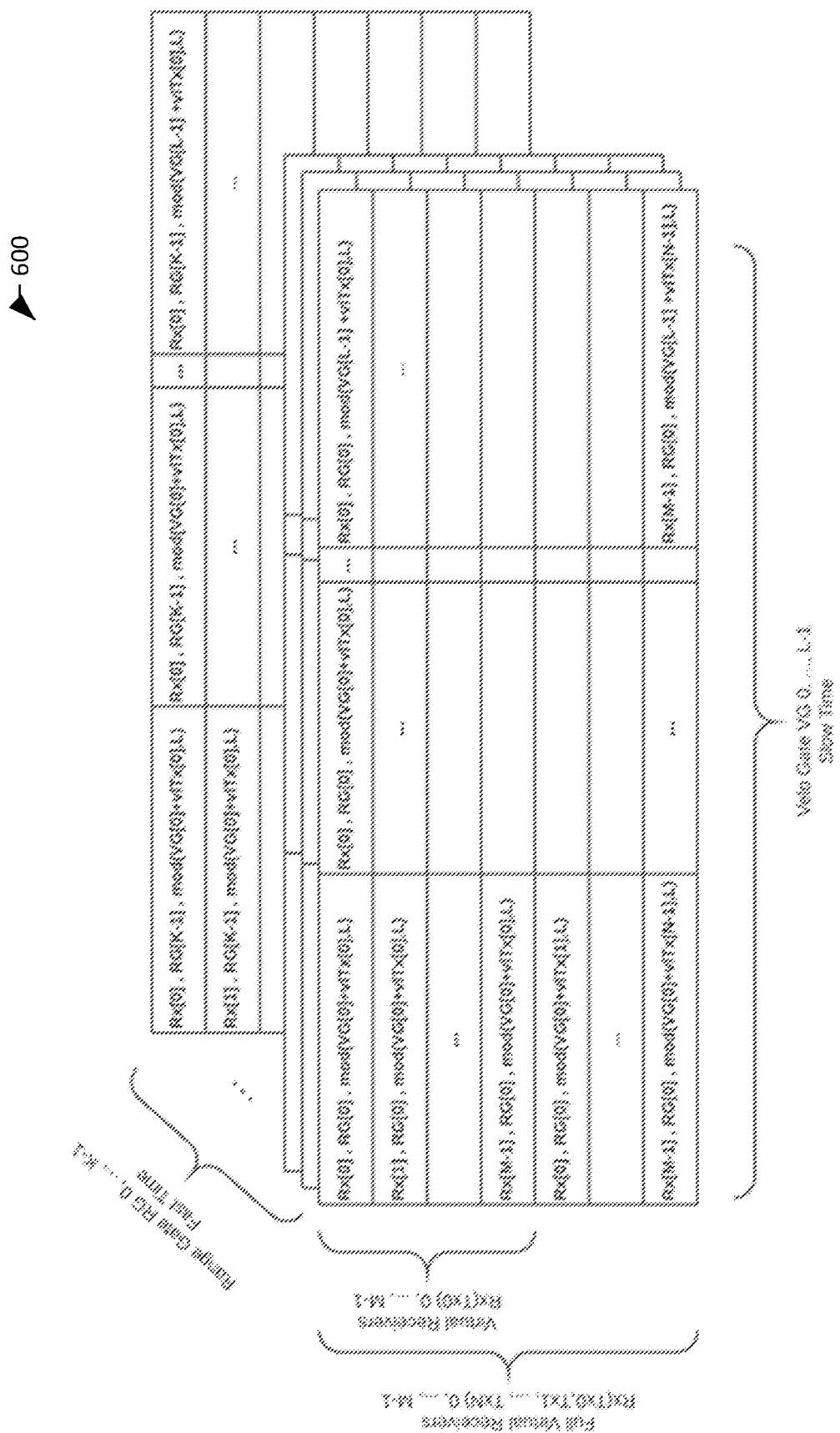

Applying this extraction approach throughout the VRx, RG, and VG dimensions of the data cube results in an extended data cube with transmitter de-multiplexing, as illustrated by the extended data cube 600 shown in FIG. 6.

The beamformer module 146 performs beamforming on data in the extended data cube, where beamforming is applied on the total of M×N virtual receivers in each range-velocity gate. Due to the VLM modulation described above, a single target energy in one range gate is distributed over the velocity dimension into P discrete velocity bins (as defined by the velocity labels and relative to the actual radial velocity of the target). An effect is that after beamforming, the velocity spectrum exhibits discrete sidelobes together with the mainlobe located at the true velocity gate of the target. Sidelobe levels are generally determined by the design of the array of transmitting antennas 110-112 and the design of the velocity labels. The minimum signal-to-sidelobe ratio (SSLR) is a function of the total number of transmitters N:

$$SSLR(N)=20 \cdot \log_{10}(N). \quad (4)$$

Due to the predefined velocity-gate iteration (by velocity labels) and modulo operations in the demultiplexing procedure, velocity sidelobes occur with a deterministic number and at deterministic locations. Thus, for a single target, the number of velocity sidelobes is P(P−1). Generally, the minimum sidelobe levels and the number of velocity sidelobes can be reduced through design of the array of transmitting antennas 110-112 and phase rates of change assigned to the transmitting antennas 110-112.

In an example, the beamformer module 144 can additionally perform interference detection and filtering. Interference of two or more targets can occur if, prior to demultiplexing, there is at least one overlapping peak in the velocity dimension that corresponds to the two or more targets. Thus, two targets $o_1$ and $o_2$, whose true velocities resolve into two velocity gates $vo_1$ and $vo_2$ interfere if the condition $$\mod(vg_{o_1}+vltx_{n_1},L)==\mod(vg_{o_2}+vlTx_{n_2},L) \quad (5)$$

for any $n_1 \in n$, $n_2 \in n$ and n=0, . . . , N−1 is met. If the beamformer module 144 performs beamforming on range-velocity gates that are subject to such interference, the beamformer module 144 can produce a degraded beam spectrum. Therefore, the beamformer module 144 can filter out such range-velocity gates.

The beamformer module 144 can filter interference before or after performing beamforming, depending upon the signal processing chain. Moreover, the beamformer module 144 can be designed, in the present of interference, to filter out all interfering targets O. In another example, the beamformer module 144 can be configured to use additional criteria when performing filtering, such as signal strengths of individual targets.

The detector module 146 can identify a detection based upon the processed CPI data cube:

$$mat_{CPI}(BG_b, RG_k, VG_l), \quad (6)$$

which has dimensions beam gate (BG), from b=0, . . . B−1, range gate (RG), and velocity gate (VG). It can be ascertained that such notation does not differentiate between horizontal and vertical beam gates; however, the matrix can be arranged to explicitly include two beam gate dimensions.

The optimized processing approach is now set forth, where the predetector module 148 is employed. The optimized processing approach is designed to efficiently employ hardware resources of the radar system 100 in terms of utilization as well as timing. Use of the optimized processing approach described herein results in reduced data load prior to beamforming, as the predetector module 148 (as will be described below) detects targets and identifies their range and velocity information; thereafter, the detected range-velocity gates are provided to the beamformer module 144 for calculation of the angular information for the targets. Accordingly, the steps prior to the Doppler FFT being performed for velocity computation are identical in the optimized processing approach to those described above with respect to the first approach.

In the second processing approach, the Doppler module 142 generates a two-dimensional heat map using the velocity processing data by integrating the M×Q virtual receivers in a non-coherent fashion—e.g.:

$$\text{heat map}(k, l) = \sum_{m=0}^{M-1} \text{abs}(\text{mat}_{CPI}(Rx_m, RG_k, VG_l)). \quad (7)$$

It is to be noted that other non-coherent integrations are also contemplated, such as summation on log(.), abs(.)$^2$, etc. The predetector module 148 receives the heat map data, which detects range-velocity gates of potential targets and performs VLM demultiplexing.

The predetector module 148 performs the following acts for every range-gate and for the first fraction of the velocity spectrum that is given by the largest distance between two subsequent velocity labels:

$$I_{velo\ fraction} = \max_{n=0,\ldots,N-1}\{\text{mod}(\text{velolabel}(\text{mod}(n+1, N))-\text{velolabel}(n),L)\}, \quad (8)$$

where $I_{velo\ fraction}$ is the size of the velocity fraction, ranging from velocity gates 0, . . . , $I_{velo\ fraction}$−1.

The predetector module 148 treats each velocity gate in the velocity fraction as a seed velocity gate; for each seed velocity, P possible true velocities can be assumed (based upon the phrase rate of change assigned to the transmitting antennas 110-112). This is illustrated in the first column of Table 1, set forth below. For the N̶ P possible true velocities, the relative positions of other velocity peaks associated with the same target can be calculated, as illustrated row-wise in Table 1.

experienced the non-coherent integration gain of M×Q virtual receivers instead of that of the full M×N virtual receiver array. This reduces the sensitivity of the predetector module 148 towards weaker targets.

To improve the non-coherent integration gain in the predetector module 148, the heat map data can be further processed to capture the full virtual receiver array (or alternatively any sub-array that can be formed from the N transmitters and M receivers). For this purpose, the true velocity possibilities $1_{true\ velo}$ can be summed up column-wise, where the number of columns taken into account corresponds to the number of transmitters involved in the formation of the sub-array (e.g., up to N columns for the full virtual receiver array). Effectively, then, $$\frac{N!}{(N-n_{use})!n_{use}!} \quad (9)$$

sub-arrays can be created for true velocity gate identification and detection for an arbitrary sub-array with $n_{use}$ involved transmitters. To achieve high non-coherent integration gain, it is desirable to use N transmitters in this step; however, this reduces the dynamic range for the predetector module 148, because the higher the number of transmitters involved in the integration process, the higher the number of velocity side lobes resulting in the velocity spectrum—e.g., $n_{use}$ ($n_{use}$−1).

In another approach, the predetector module 148 can use a range-dependent number of transmitters for true velocity gate identification and detection. In particular, the number of transmitters involved in the non-coherent integration process are increased with the range of the potential target. This is due to the fact that targets at further distances require higher sensitivity of the detector to be detected. Thus, the farther the potential target is located in a range gate, the more transmitters are used for the non-coherent integration process.

This approach is desirable because it balances the advantages and disadvantages of using only one transmitter versus that of all N transmitters in the non-coherent integration process.

TABLE 1

| | true velocity possibility based on seed velo gate vgSeed | | |
|---|---|---|---|
| | Tx0 | Tx1 | . . . TxN̶P-1 |
| vgSeed vlTx0 | vgSeed | (vgSeed-vlTx0 + vlTx1)mod L | (vgSeed-vlTx0 + vlTxP-1)mod L |
| vgSeed-vlTx1 | (vgSeed-vlTx1 + vlTx0)mod L | vgSeed | . . . . . . |
| . . . | . . . | . . . | . . . . . . |
| vgSeed-vlTxN̶P-1 | (vgSeed-vlTxP-1 + vlTx0)mod L . . . | | . . . vgSeed |

The predetector module 148 can use a single or another fixed number of transmitters for true velocity gate identification (e.g., information required for VLM demultiplexing) and detection. Initially an approach using a single transmitter is described, followed by an approaching using an arbitrary number of transmitters.

The true velocity possibility $1_{true\ velo} \in$ {vgSeed−vlTx0, . . . , vgSeed−vlTxP−1 that maximizes the magnitude of eq. (7) for range gate k identifies the true velocity gate. This applies to any column of table I. A threshold detector can be applied on the magnitude of heat map(k, $1_{true\ velo}$) to detect potential targets in the respective range-velo gates. A disadvantage of this approach is that the first detector is applied on the heat map data (eq. (7)), which has yet only The beamformer module 144 can apply beamforming for the range-velocity gates of the potential target identified by the predetector module 148. The detector module 146 then makes a detection in the beam dimension. It is possible to subsequently apply an interference filter as described in the previously described (first) process. Alternatively, the interference filter can be applied at the output of the predetector module 148, which results in fewer range-Doppler detections to be passed to the beamformer module 144 (thereby saving processing resources).

Figure 2:
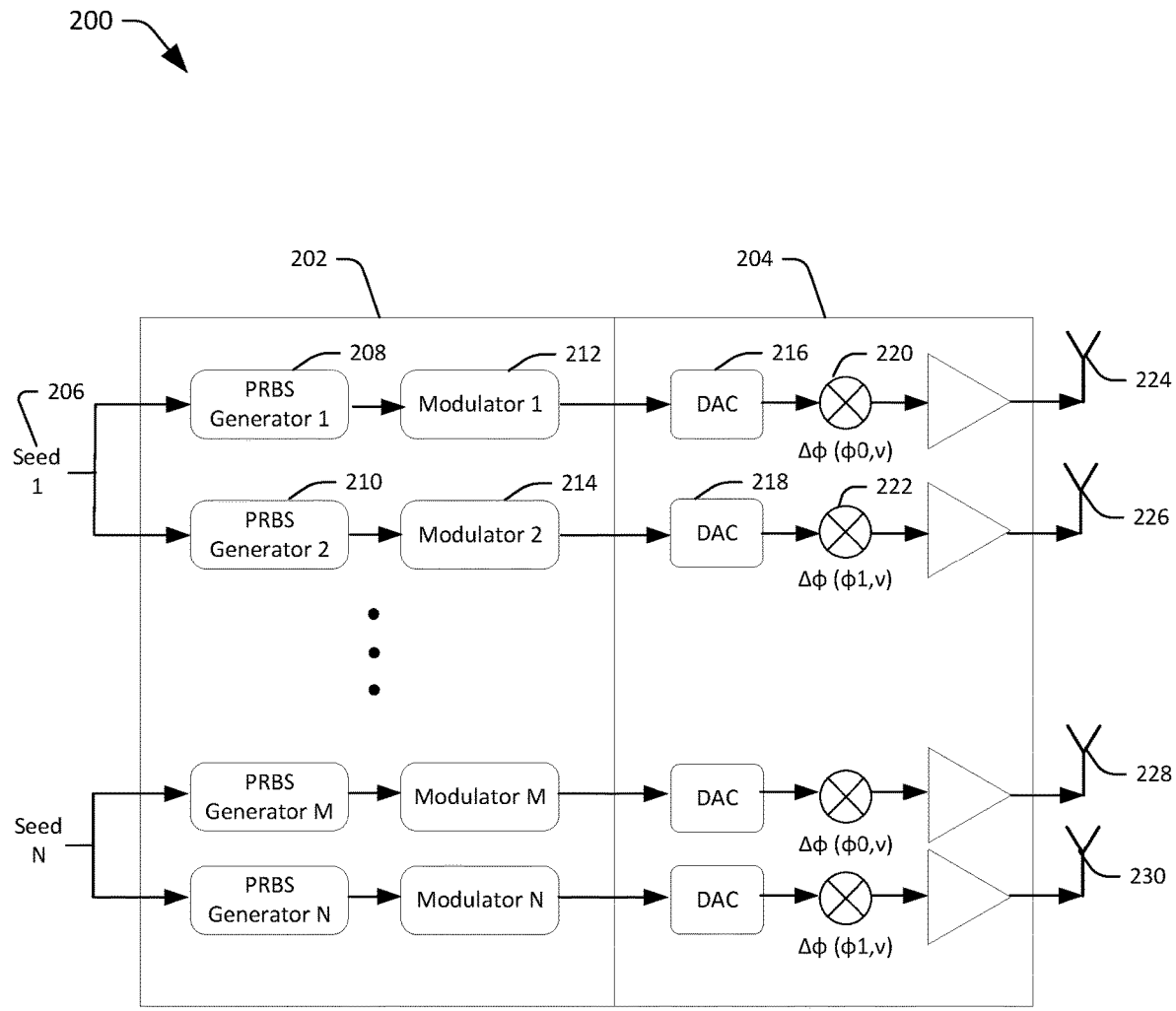
FIG. 2 is a functional block diagram that illustrates a transmit side of a PMCW radar on a chip (RoC).

Turning now to FIG. 2, illustrated is a functional block diagram that illustrates a transmit side of a PMCW radar on a chip (RoC) 200.

RoC 200 can include a digital portion 202 and an analog portion 204. The RoC 200 can include N transmit antennas 224-230, and each transmit antennas can have an associated transmit chain of digital and analog components. Each grouping of antennas (e.g., 224 and 226, 228 and 230) can transmit an identical modulation signal that has been phase shifted to enable a receiver to distinguish between the transmissions. In an embodiment, the antennas are grouped in pairs, but in other embodiments, different groupings are possible.

In the embodiment shown in FIG. 2, a common seed input 206 can be provided to PRBS generators 208 and 210, which output an identical code sequence which can be modulated by modulators 212 and 214. The resulting modulation signal can have a sequence of pulses that are phase shifted on a PRI basis. Digital to analog converters 216 and 218 convert the digital signal to an analog signal, and IQ mixers 220 and 222 can apply respective phase shifts φ0 or φ1.

Figure 3:
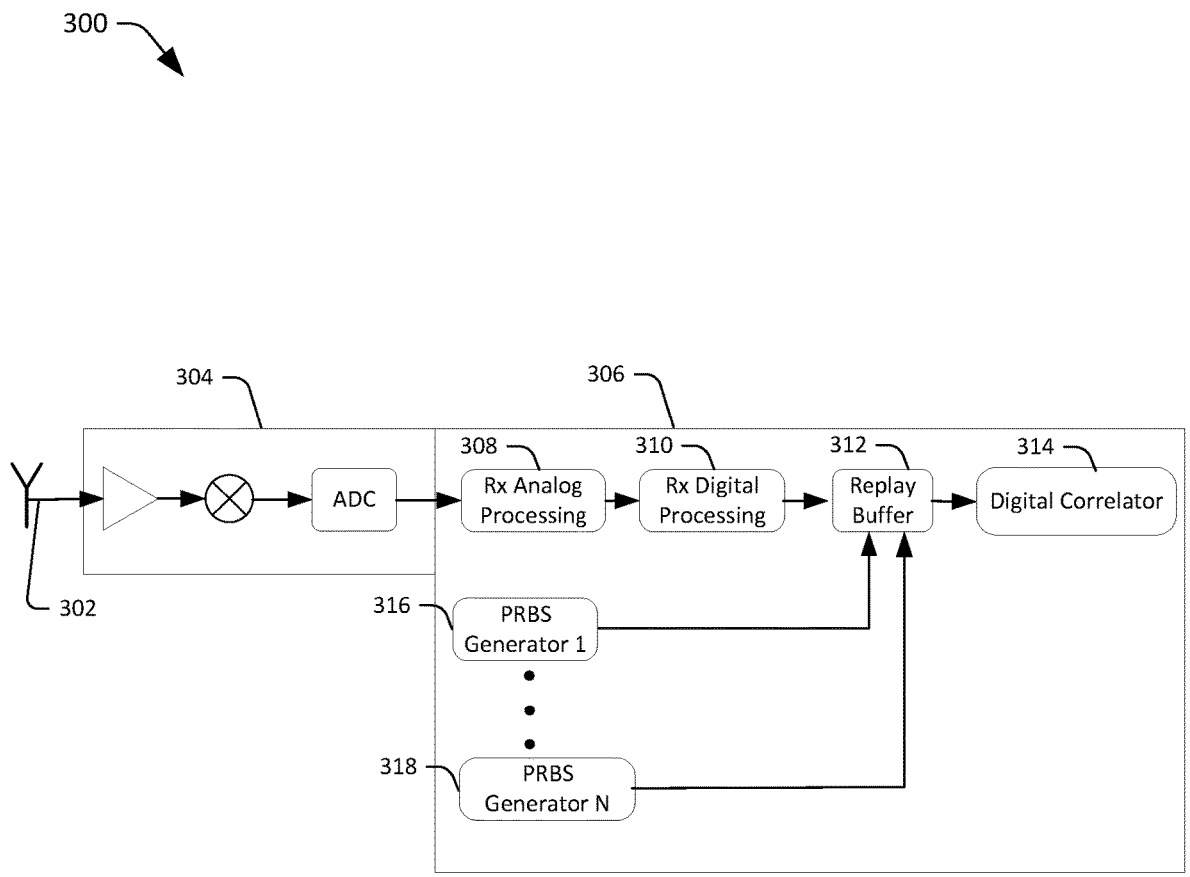
FIG. 3 is a functional block diagram that illustrates a receive side of a PMCW RoC.

Turning now to FIG. 3, illustrated is a functional block diagram that illustrates a receive side of a PMCW RoC 300. As with the transmit portion of the RoC, the receive portion includes analog components 304 and digital components 306. The receive antennas 302 receives echo signals corresponding to the transmissions from the transmit antennas 224-230. After the received signals are passed through the Rx Analog processing block 308 and Rx Digital processing block 310, the received signals are sent to a Replay Buffer 312. The matched filters needed for Digital Correlation can be generated based on a code sequence from PRBS 316-318 that receive the same seed input that were provided to the transmit antennas (e.g., seed input 206). A digital correlator 314 can then perform the correlation and other processing.

In an embodiment, since each code sequence provided by the PRBS generators 316-318 can be used to generate two signals for the matched filters, the overall data throughput is halved so the digital correlator performs half the amount of work in a traditional commercial PMCW radar system. With the reduction in bandwidth, the number of range bins can be increased to give longer range on the detection, or the PRI can be reduced so that the radar has a wider Doppler span.

Figure 4:
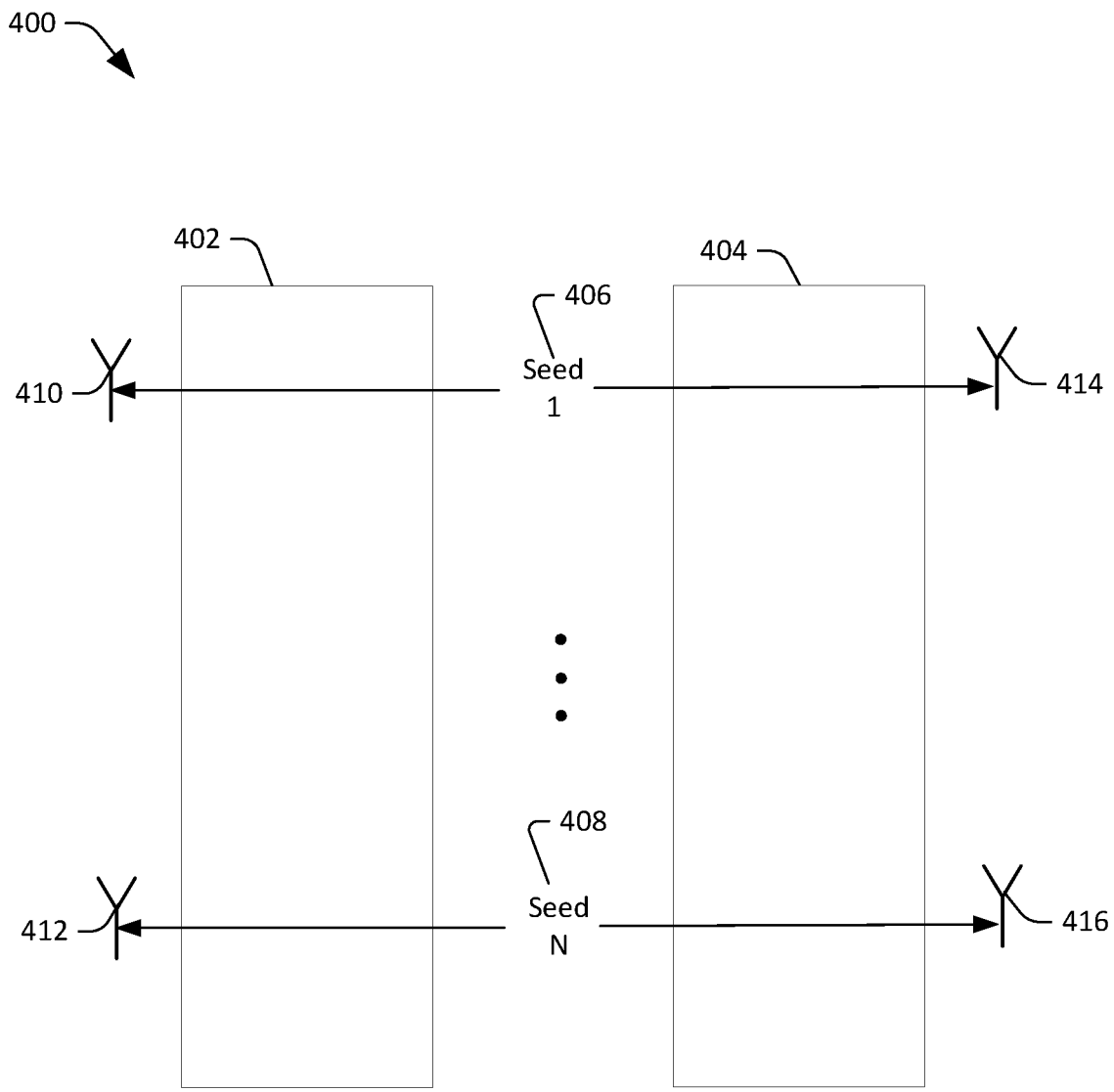
FIG. 4 is a functional block diagram that illustrates the transmit sides of a dual PMCW RoC.

Turning now to FIG. 4, illustrated is a functional block diagram 400 that illustrates the transmit sides of a dual PMCW RoC. In the embodiment shown in FIG. 4, the radar system can have a first RoC 402 and a second RoC 404 that have transmit antennas that are provided common seed inputs. For example, transmit antennas 410-412 on RoC 402, and transmit antennas 414-416 on RoC 404 can receive inputs from seeds 406-408. The modulation signals for transmit antenna 414 and 410 are identical, but different phase shifts can be applied to each modulation signal by IQ mixers on the respective transmit chains.

Each RoC 402 and 404 can operate with a single set of parameters which improves robustness and reliability of the radars as each transmitter is cycling through the same parameters on a PRI basis, and not shifting phases between φ0 or φ1 as in single RoC embodiment.

Figure 8:
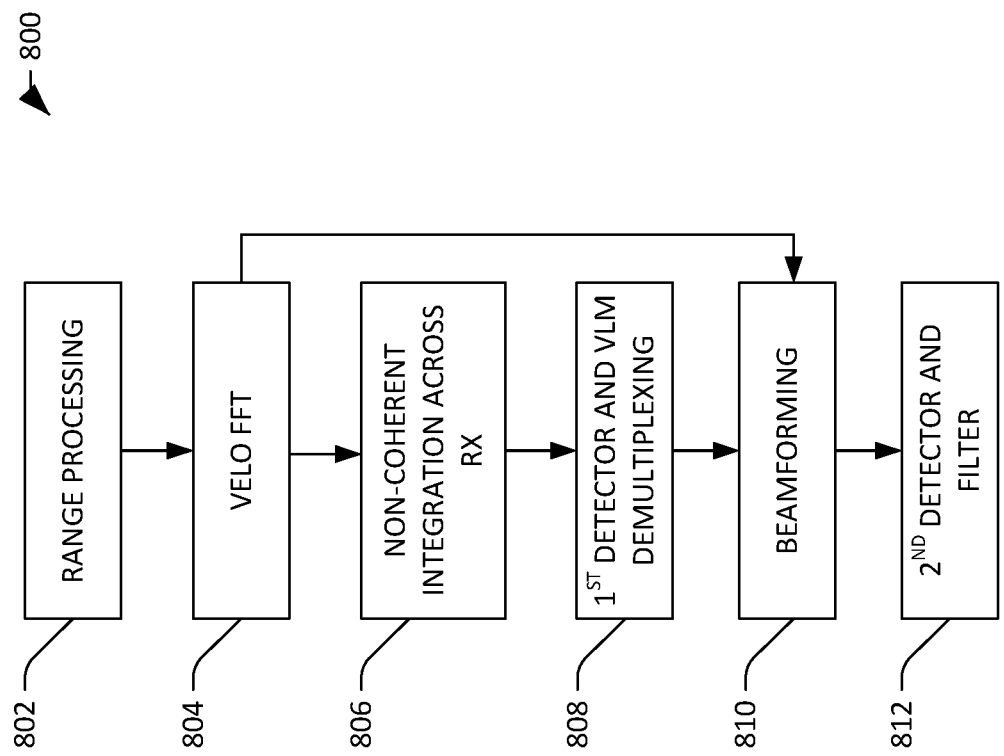
FIG. 8 is a flow diagram that illustrates another method for generating a radar detection of an object.
Figure 7:
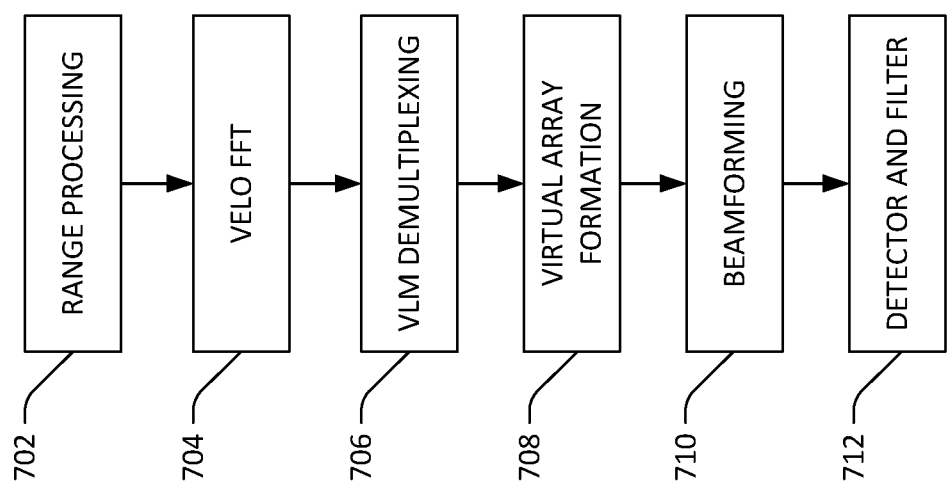
FIG. 7 is a flow diagram that illustrates a method for generating a radar detection for an object.

FIGS. 7 and 8 illustrate methodologies relating to processing radar data to compute information about an object in a scene. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, a methodology 700 that can be performed by the processing circuitry 138 of the radar system 100 is illustrated. At 702, a range processing step can be carried out that comprises correlating the samples of data received from the receiver digital hardware 310 with a copy of the transmitted digital sequences 316-318 to determine range bins for targets in a scene. At 704, a velocity FFT is performed with respect to samples of data (slow time) received from the digital correlator 314 to determine (ambiguous) velocity bins for the targets in the scene. At 706, VLM demultiplexing is performed to construct a multi-dimensional data matrix. At 708, virtual array formation is performed by extracting arrays from the multi-dimensional matrix that correspond to each transmitter. At 710, beamforming is performed on each virtual array formed at 708, and at 712, a detector detects targets and filters interfering targets.

Referring to FIG. 8, an alternate methodology 800 that can be performed by the processing circuitry 138 of the radar system 100 is presented. At 802, a range processing step is carried out which comprises correlating the samples of data received from the receiver digital hardware 310 with a copy of the transmitted digital sequences 316-318 to determine range bins for targets in a scene. At 804, a velocity FFT is performed with respect to samples of data (slow time) received from the digital correlator 314 to determine (ambiguous) velocity bins for the targets in the scene. At 806, non-coherent integration is performed across receivers in the radar system 100, and at 808 a first detection is performed and further demultiplexing is performed in order to compute velocities for the targets. At 810, beamforming is applied using the detected velocities as well as data corresponding to the detected velocities acquired during the velocity FFT at 804. At 812, a second detection is performed to assign angular information to the targets (and optionally filtering is undertaken to filter interfering targets).

Figure 9:
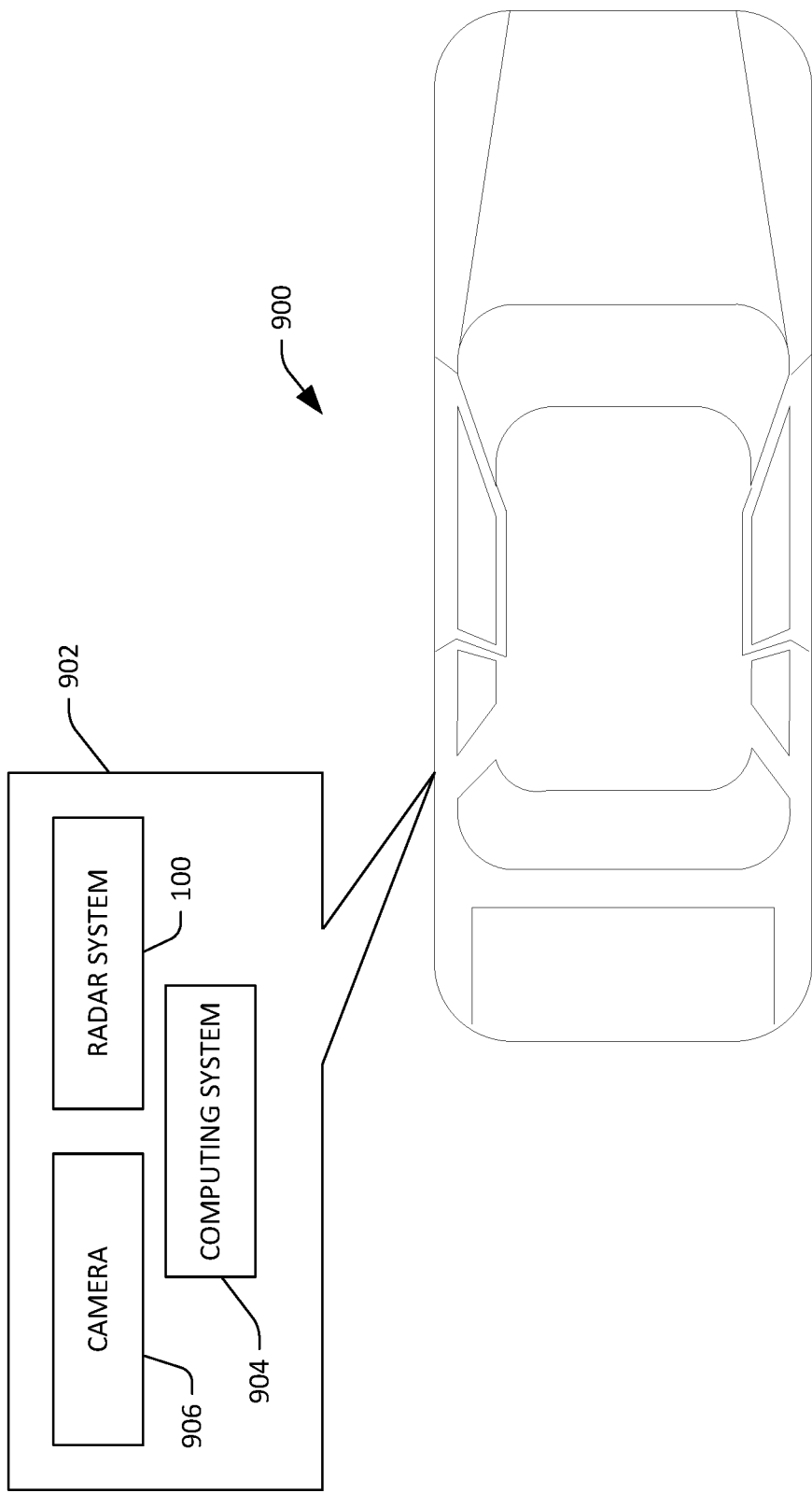
FIG. 9 is a schematic that illustrates an autonomous vehicle (AV).

FIG. 9 is a schematic of an autonomous vehicle (AV) 900. As illustrated in callout 902, the AV 900 includes the radar system 100. In addition, the AV 900 includes a computing system 904 that is in communication with the radar system 904, where the computing system 904 is in communication with systems of the AV 900, such as a propulsion system (e.g., an electric motor, a combustion engine, etc.), a braking system, a steering system, etc. The AV 900 also optionally includes a camera 906 that is in communication with the computing system 904. While not illustrated, the AV 900 can also optionally include other sensor systems, such as a LIDAR sensor system, a positional sensor system (such as a GPS sensor system), an accelerometer, etc. The computing system 900 receives detections output by the radar system 100 (and optionally images output by the camera 906 and/or other sensor systems) and causes the AV 900 to plan and/or perform a driving maneuver based upon the detections. For instance, the computing system 900 can, based upon the detections, control the propulsion system to cause the AV 900 to accelerate, to maintain a constant velocity, to decelerate, etc. In another example, the computing system 904 can, based upon the detections, control the braking system to initiate braking, to release from braking, etc. In still yet another example, the computing system 904 can, based upon the detections, control the steering system to turn, to maintain course, etc. The AV 900 may be a fully autonomous vehicle. In other examples, the radar system 100 can be employed in a partially autonomous vehicle, where detections can be employed by driver assistance technologies.

Figure 10:
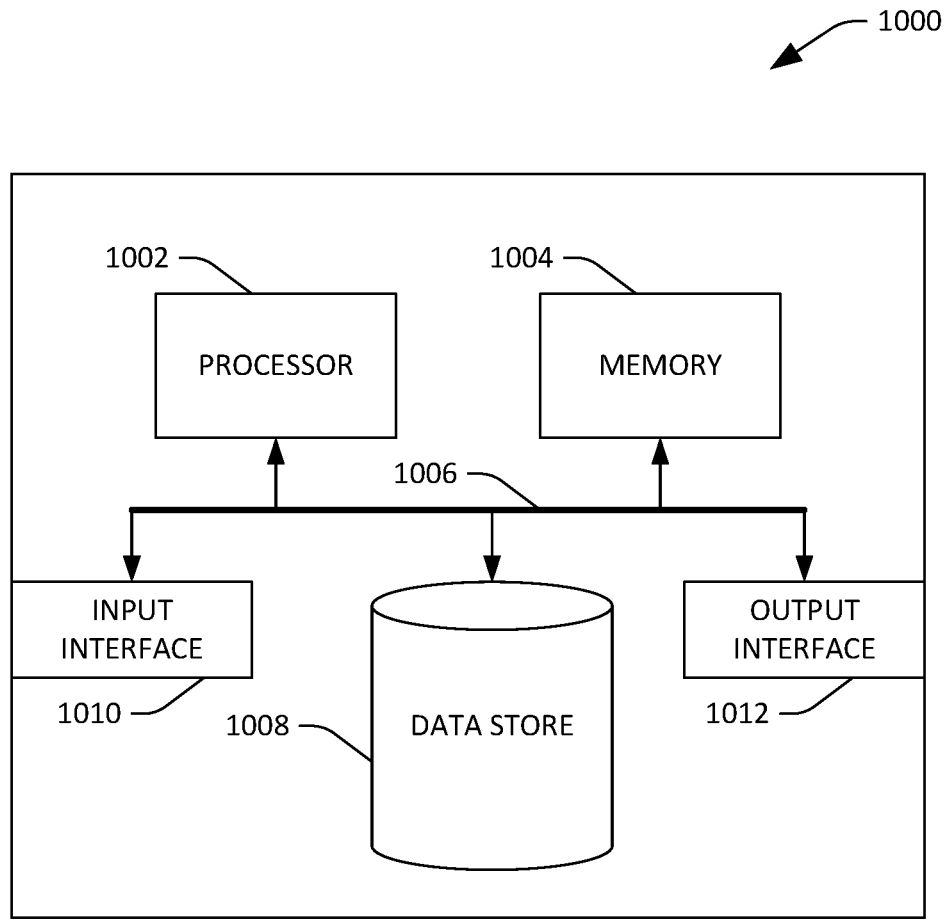
FIG. 10 depicts a computing device.

Referring now to FIG. 10, a high-level illustration of an exemplary computing device 1000 that can be used in accordance with the systems and methodologies disclosed herein is illustrated. For instance, the computing device 1000 may be or be included within the radar system 100 and/or the AV 900. The computing device 1000 includes at least one processor 1002 that executes instructions that are stored in a memory 1004. The instructions may be, for instance, instructions for implementing functionality described as being carried out by one or more systems discussed above or instructions for implementing one or more of the methods described above. The processor 1002 may be a GPU, a plurality of GPUs, a CPU, a plurality of CPUs, a multi-core processor, etc. The processor 1002 may access the memory 1004 by way of a system bus 1006. In addition to storing executable instructions, the memory 1004 may also store range data, velocity data, velocity labels, etc.

The computing device 1000 additionally includes a data store 1008 that is accessible by the processor 1002 by way of the system bus 1006. The data store 1008 may include executable instructions, range data, velocity data, velocity labels, etc. The computing device 1000 also includes an input interface 1010 that allows external devices to communicate with the computing device 1000. For instance, the input interface 1010 may be used to receive instructions from an external computer device, etc. The computing device 1000 also includes an output interface 1012 that interfaces the computing device 1000 with one or more external devices. For example, the computing device 1000 may transmit control signals to the engine, the braking system, and/or the steering system by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The disclosure set forth herein relates to a PMCW radar system according to at least the following examples.

(A1) In an aspect, some embodiments include a phase-modulated continuous wave (PMCW) radar system that includes a first transmit antenna that transmits a first transmission based on a first modulation signal, wherein the first transmission has a first velocity offset. The PMCW radar system can also include a second transmit antenna that transmits simultaneously with the first, transmit antenna, wherein the second transmit antenna transmits a second transmission based on a second modulation signal, wherein the first modulation signal and the second modulation signal are based upon a seed input, and further wherein the second transmission has a second velocity offset different than the first velocity offset.

(A2) In some embodiments, the PMCW radar system of (A1) also includes a first modulator that generates the first modulation signal and a second modulator that generates the second modulation signal, wherein the first modulator and second modulator receive inputs from respective pseudo-random number generators that use the seed input.

(A3) In some embodiments of the PMCW radar system of at least one of (A1)-(A2) the first modulator and the second modulator modulate the first modulation signal and the second modulation signal based on a predefined pulse repetition interval.

(A4) In some embodiments of the PMCW radar system of at least one of (A1)-(A3) the first transmit antenna and the second transmit antenna form a portion of an antenna array.

(A5) In some embodiments of the PMCW radar system of at least one of (A1)-(A4) the PMCW radar system also includes a receiving antenna that is configured to receive an echo signal that corresponds to at least one of the first transmission or the second transmission. The PMCW radar system can also include processing circuitry that is coupled to the receiving antenna, where the processing circuitry generates a detection based upon the echo signal, and further wherein the detection includes a range of an object between the PMCW radar system and the object, a velocity of the object relative to the PMCW radar system, and an angle of the object relative to the PMCW radar system.

(A6) In some embodiments of the PMCW radar system of at least one of (A1)-(A5) the PMCW radar system is included in an autonomous vehicle (AV), wherein the AV performs a driving maneuver based upon the detection.

(A7) In some embodiments of the PMCW radar system of at least one of (A1)-(A6), each group of transmit antennas of the antenna array share identical baseband modulating signals.

(A8) In some embodiments of the PMCW radar system of at least one of (A1)-(A7), the first transmit antenna and the second transmit antenna are located on a single radar on a chip device.

(A9) In some embodiments of the PMCW radar system of at least one of (A1)-(A7), the first transmit antenna and the second transmit antenna are located on separate radar on a chip devices.

(B1) In another aspect, a method can include transmitting, by a first transmit antenna of a phase-modulated continuous wave (PMCW) radar system, a first transmission that has a first velocity offset, wherein the first transmission is based on a first modulation signal. The method also includes transmitting, by a second transmit antenna of the PMCW radar system that transmits simultaneously with the first transmit antenna, a second transmission that has a second velocity offset different than the first velocity offset, wherein the second transmission is based on a second modulation signal, wherein the first modulation signal and the second modulation signal are based upon a seed input.

(B2) In some embodiments of the method of (B1), the method also includes modulating the first modulation signal and the second modulation signal based on an identical baseband modulating signal.

(B3) In some embodiments of at least one of the methods of (B1)-B2), the method also includes modulating the first modulation signal and the second modulation signal based on a predefined pulse repetition interval.

(B4) In some embodiments of the methods of at least one of (B1)-(B3), the method further includes detecting, by a receiving antenna, an echo signal, the echo signal based upon at least one of the first transmission or the second transmission. The method also includes computing a velocity of an object relative to the PMCW radar system based upon the echo signal. The method additionally includes controlling at least one of a propulsion system, a braking system, or a steering system of an autonomous vehicle (AV) based upon the computed velocity of the object relative to the PMCW radar system.

(B5) In some embodiments of the at least one of the methods of (B1)-(B4), the first transmit antenna and the second transmit antenna form a portion of an antenna array on a single radar on a chip.

(B6) In some embodiments of the methods of at least one of (B1)-(B5) the first transmit antenna is on a first radar on a chip and the second transmit antenna is on a second radar on a chip.

(C1) In yet another aspect, some embodiments include a computer-readable storage medium that includes instructions that, when executed by a processor, cause the processor to perform a series of acts, where the acts include causing a first transmit antenna of a phase-modulated continuous wave (PMCW) radar system to transmit a first transmission that has a first velocity offset, where the first transmission is based on a first modulation signal. The acts also include causing a second transmit antenna of the PMCW radar system to transmit, simultaneously with the first transmit antenna, a second transmission that has a second velocity offset different than the first velocity offset, wherein the second transmission is based on a second modulation signal, wherein the first modulation signal and the second modulation signal are based upon a seed input.

(C2) In some embodiments of the computer-readable storage medium of (C1), the first modulation signal and the second modulation signal based are modulated based upon an identical baseband modulating signal.

(C3) In some embodiments of the computer-readable storage medium of at least one of (C1)-(C2), the first modulation signal and the second modulation signal are modulated based on a predefined pulse repetition interval.

(C4) In some embodiments of the computer-readable storage medium of at least one of (C1)-(C3), a receiving antenna detects an echo signal, the echo signal based upon at least one of the first transmission or the second transmission. The acts also include computing a velocity of an object relative to the PMCW radar system based upon the echo signal. The acts further include controlling at least one of a propulsion system, a braking system, or a steering system of an autonomous vehicle (AV) based upon the computed velocity of the object relative to the PMCW radar system.

(C5) In some embodiments of the computer-readable storage medium of at least one of (C1)-(C4), the first transmit antenna is on a first radar on a chip and the second transmit antenna is on a second radar on a chip.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A phase-modulated continuous wave (PMCW) radar system comprising:
    a first pseudo-random binary sequence generator (PRBS) that generates a code sequence based upon a seed input;
    a first modulator that modulates a first PMCW radar signal based upon the code sequence generated by the first PRBS to form a first modulated signal;
    a first mixer that applies a first phase shift in accordance with a first phase rate of change to the first modulated signal to form a first transmit signal;
    a first transmit antenna that transmits the first transmit signal, wherein the first transmit signal has a first velocity offset that corresponds to the first phase rate of change;
    a second PRBS that generates the code sequence based upon the seed input;
    a second modulator that modulates a second PMCW radar signal based upon the code sequence generated by the second PRBS to form a second modulated signal;
    a second mixer that applies a second phase shift in accordance with a second phase rate of change to the second modulation signal to form a second transmit signal; and
    a second transmit antenna that transmits simultaneously with the first transmit antenna, wherein the second transmit antenna transmits the second transmit signal, wherein the second transmit signal has a second velocity offset that corresponds to the second phase rate of change, and further wherein the second velocity offset is different than the first velocity offset.

2. The PMCW radar system of claim 1, wherein the first modulator and the second modulator modulate the first PMCW radar signal and the second PMCW radar signal based on a predefined pulse repetition interval.

3. The PMCW radar system of claim 1, wherein the first transmit antenna and the second transmit antenna form a portion of an antenna array.

4. The PMCW radar system of claim 2, wherein each group of transmit antennas of the antenna array share identical baseband modulating signals.

5. The PMCW radar system of claim 1, further comprising:
a receiving antenna that is configured to receive an echo signal that corresponds to at least one of the first transmit signal or the second transmit signal; and
processing circuitry that is coupled to the receiving antenna, wherein the processing circuitry generates a detection based upon the echo signal, and further wherein the detection includes a range of an object between the PMCW radar system and the object, a velocity of the object relative to the PMCW radar system, and an angle of the object relative to the PMCW radar system.

6. The PMCW radar system of claim 5 included in an autonomous vehicle (AV), wherein the AV performs a driving maneuver based upon the detection.

7. The PMCW radar system of claim 1, wherein the first transmit antenna and the second transmit antenna are located on a single radar on a chip device.

8. The PMCW radar system of claim 1, wherein the first transmit antenna and the second transmit antenna are located on separate radar on a chip devices.

9. The PMCW radar system of claim 1, wherein the PMCW radar system is configured to estimate a velocity of a target relative to the PMCW radar system over a velocity range, wherein the first phase rate of change corresponds to the first velocity offset within the velocity range, and wherein the second phase rate of change corresponds to the second velocity offset within the velocity range.

10. A method, comprising:
generating, by a first pseudo-random binary sequence generator (PRBS) of a phase-modulated continuous wave (PMCW) radar system, a code sequence based upon a seed input;
modulating, by a first modulator of the PMCW radar system, a first PMCW radar signal based upon the code sequence generated by the first PRBS to form a first modulated signal;
applying, by a first mixer of the PMCW radar system, a first phase shift in accordance with a first phase rate of change to the first modulated signal to form a first transmit signal;
transmitting, by a first transmit antenna of the PMCW radar system, a first transmit signal, wherein the first transmit signal has a first velocity offset that corresponds to the first phase rate of change;
generating, by a second PRBS of the PMCW radar system, the code sequence based upon the seed input;
modulating, by a second modulator of the PMCW radar system, a second PMCW radar signal based upon the code sequence generated by the second PRBS to form a second modulated signal;
applying, by a second mixer of the PMCW radar system, a second phase shift in accordance with a second phase rate of change to the second modulated signal to form a second transmit signal; and
transmitting, by a second transmit antenna of the PMCW radar system that transmits simultaneously with the first transmit antenna, the second transmit signal, wherein the second transmit signal has a second velocity offset that corresponds to the second phase rate of change, and wherein the second velocity offset is different than the first velocity offset.

11. The method of claim 10, further comprising:
modulating the first PMCW radar signal and the second PMCW radar signal based on an identical baseband modulating signal.

12. The method of claim 10, further comprising:
modulating the first PMCW radar signal and the second PMCW radar signal based on a predefined pulse repetition interval.

13. The method of claim 10, further comprising:
detecting, by a receiving antenna, an echo signal, the echo signal based upon at least one of the first transmit signal or the second transmit signal;
computing a velocity of an object relative to the PMCW radar system based upon the echo signal; and
controlling at least one of a propulsion system, a braking system, or a steering system of an autonomous vehicle (AV) based upon the computed velocity of the object relative to the PMCW radar system.

14. The method of claim 13, wherein the first transmit antenna and the second transmit antenna form a portion of an antenna array on a single radar on a chip.

15. The method of claim 13, wherein the first transmit antenna is on a first radar on a chip and the second transmit antenna is on a second radar on a chip.

16. A computer-readable storage medium comprising instructions that, when executed by a processor, cause the processor to perform the following acts:
causing a first pseudo-random binary sequence generator (PRBS) of a phase-modulated continuous wave (PMCW) radar system to generate a code sequence based upon a seed input;
causing a first modulator of the PMCW radar system to modulate a first PMCW radar signal based upon the code sequence generated by the first PRBS to form a first modulated signal;
causing a first mixer of the PMCW radar system to apply a first phase shift in accordance with a first phase rate of change to the first modulated signal to form a first transmit signal;
causing a first transmit antenna of the PMCW radar system to transmit a first transmit signal, wherein the first transmit signal has a first velocity offset that corresponds to the first phase rate of change;
causing a second PRBS of the PMCW radar system to generate the code sequence based upon the seed input;
causing a second modulator of the PMCW radar system to modulate a second PMCW radar signal based upon the code sequence generated by the second PRBS to form a second modulated signal;
causing a second mixer of the PMCW radar system to apply a second phase shift in accordance with a second phase rate of change to the second modulated signal to form a second transmit signal; and
causing a second transmit antenna of the PMCW radar system to transmit, simultaneously with the first transmit antenna, the second transmit signal, wherein the second transmit signal has a second velocity offset that corresponds to the second phase rate of change, and wherein the second velocity offset is different than the first velocity offset.

17. The computer-readable storage medium of claim 16, the acts further comprising:

causing the first modulator to modulate the first PMCW radar signal and the second modulator to modulate the second PMCW radar signal based on an identical baseband modulating signal.

18. The computer-readable storage medium of claim 16, the acts further comprising:
causing the first modulator to modulate the first PMCW radar signal and the second modulator to modulate the second PMCW radar signal based on a predefined pulse repetition interval.

19. The computer-readable storage medium of claim 16, wherein a receiving antenna detects an echo signal, the echo signal based upon at least one of the first transmit signal or the second transmit signal, the acts further comprising:
computing a velocity of an object relative to the PMCW radar system based upon the echo signal; and
controlling at least one of a propulsion system, a braking system, or a steering system of an autonomous vehicle (AV) based upon the computed velocity of the object relative to the PMCW radar system.

20. The computer-readable storage medium of claim 16, wherein the first transmit antenna is on a first radar on a chip and the second transmit antenna is on a second radar on a chip.

* * * * *